US006926232B2

(12) United States Patent
Franchet et al.

(10) Patent No.: US 6,926,232 B2
(45) Date of Patent: Aug. 9, 2005

(54) VARIABLE CYCLE PROPULSION SYSTEM WITH COMPRESSED AIR TAPPING FOR A SUPERSONIC AIRPLANE

(75) Inventors: Michel Franchet, Pouilly-le-Fort (FR); Yann Laugier, Noiseau (FR); Jean Loisy, Ponthierry (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 10/167,419

(22) Filed: Jun. 13, 2002

(65) Prior Publication Data

US 2002/0190159 A1 Dec. 19, 2002

(30) Foreign Application Priority Data

Jun. 14, 2001 (FR) .............................. 01 07773

(51) Int. Cl.⁷ .............................................. B64D 27/00
(52) U.S. Cl. ........................... 244/53 B; 55/58; 60/224
(58) Field of Search ................................. 244/15, 53 R, 244/53 B, 54, 55, 58, 73 R, 74; 60/270.1, 226.1, 224

(56) References Cited

U.S. PATENT DOCUMENTS

| | | | |
|---|---|---|---|
| 2,409,177 A | | 10/1946 | Allen et al. |
| 3,149,461 A | * | 9/1964 | Eichholtz |
| 3,168,998 A | * | 2/1965 | Eichholtz |
| 3,388,878 A | * | 6/1968 | Peterson et al. ............. 244/12.3 |
| 3,489,377 A | * | 1/1970 | Pearson et al. ................ 244/58 |
| 3,659,422 A | * | 5/1972 | Hope .......................... 60/224 |
| 3,972,490 A | * | 8/1976 | Zimmermann et al. .... 244/12.3 |
| 4,193,262 A | | 3/1980 | Snell |
| 4,222,233 A | * | 9/1980 | Johnson et al. ................ 60/225 |
| 5,275,356 A | * | 1/1994 | Bollinger et al. .......... 244/12.3 |
| 5,529,263 A | * | 6/1996 | Rudolph ....................... 244/55 |
| 2002/0190159 A1 | | 12/2002 | Franchet et al. |

FOREIGN PATENT DOCUMENTS

FR 2 784 960 4/2000
GB 1 211 081 11/1970

OTHER PUBLICATIONS

U.S. Appl. No. 10/167,419, filed Jun. 13, 2002, Franchet et al.
U.S. Appl. No. 10/994,357, filed Nov. 23, 2004, Franchet et al.
Y. Saito, et al., Journal of Propulsion and Power, vol. 9, No. 6, XP 000412352, pp. 867–873, "Conceptual Study of Separated Core Ultrahigh Bypass Engine", Nov. 1, 1993.

* cited by examiner

Primary Examiner—Galen Barefoot
(74) Attorney, Agent, or Firm—Oblon, Spivak, McClelland, Maier & Neustadt, P.C.

(57) ABSTRACT

A variable cycle propulsion system for a supersonic airplane, the system comprising at least one engine having at least one compressor and capable of generating thrust for supersonic flight speeds, and at least one auxiliary propulsion assembly separate from said engine, and capable of generating additional thrust for takeoff, landing, and subsonic cruising speeds, at least one pipe connecting the engine to the auxiliary propulsion assembly to convey thereto compressed air produced by the compressor so as to enable the auxiliary propulsion assembly to generate additional thrust for takeoff, landing, and subsonic cruising flight, there being at least one valve enabling the pipe to be closed off for supersonic cruising flight.

6 Claims, 3 Drawing Sheets

VARIABLE CYCLE PROPULSION SYSTEM WITH COMPRESSED AIR TAPPING FOR A SUPERSONIC AIRPLANE

BACKGROUND OF THE INVENTION

The present invention relates to a variable cycle propulsion system for a supersonic airplane making it possible firstly to obtain high thrust with a high bypass ratio during takeoff, landing, and subsonic cruising flight in order to greatly reduce noise during those stages of flight and to improve specific fuel consumption, and secondly to obtain a high exhaust speed adapted to supersonic cruising flight.

More particularly, the invention relates to a propulsion system that has two different configurations: one configuration for takeoff, landing, and subsonic cruising flight; and another configuration for supersonic cruising flight.

When designing a supersonic commercial airplane, there arises the particular problem of low airplane engine noise during takeoff, climbing, and landing. In order to be certified, all airplanes must nowadays comply with low noise regulations for takeoff and landing.

Furthermore, supersonic airplane engines must also satisfy requirements of low engine pod drag during supersonic cruising, low specific fuel consumption while overflying inhabited areas at subsonic cruising speed, and reduced emissions of nitrogen oxide pollution close to the ozone layer at high altitude.

In order to satisfy these various requirements, engine manufacturers have proposed a variable cycle engine for propelling supersonic airplanes. Typically, that type of engine comprises a gas generator and at least one fan, the fan enabling the bypass ratio of the engine to be adjusted and thus enabling noise to be reduced. The engine adopts two different configurations: a configuration for subsonic cruising flight, takeoff, and landing using high bypass ratio; and another configuration for supersonic cruising flight with a low bypass ratio since there exists a degree of incompatibility between those two stages of flight in terms of engine operation.

The requirement for low engine noise during takeoff and landing implies in particular a low gas exhaust speed during takeoff and at subsonic cruising speed, and that is in contradiction with supersonic cruising flight which requires gas to be exhausted at high speed.

Noise level depends on gas exhaust speed, and to reduce noise to an acceptable level, exhaust speed must nowadays be less than 400 meters per second (m/s), which corresponds to a threshold of 103 decibels (dB) (with new regulations reducing this to 300 m/s or 90 dB as from the year 2006). Such an exhaust speed thus implies an engine having low specific thrust, which corresponds to a large bypass ratio, i.e. to a high level of drag when cruising at supersonic speed.

Thus, the variable cycle engines proposed by manufacturers seek to combine low engine noise during takeoff and landing, low specific fuel consumption during subsonic cruising, and high specific thrust during high altitude supersonic cruising.

Various variable cycle engine designs are known, however varying the bypass ratio of such designs does not enable optimization to be good, both in the subsonic configuration and in the supersonic configuration.

Adopting a gas exhaust speed that is equal to or less than 400 m/s requires an engine pod to be of large diameter, and all presently-known variable cycle engines, and in particular, when the fan is connected to and integrated in the engine, those described in French patents Nos. 2 513 697, 2 688 271, and 2 685 385 require the pod to present a front section that is larger than that which is optimum for supersonic cruising flight.

For example, U.S. Pat. No. 5,529,263 discloses a supersonic airplane having a propulsion assembly for takeoff, landing, and subsonic cruising flight, and two engines adapted for supersonic cruising flight. The propulsion assembly is constituted by retractable high-bypass ratio booster turbojets, and that presents numerous drawbacks, in particular concerning bulk and weight for the airplane.

OBJECT AND SUMMARY OF THE INVENTION

The present invention thus seeks to mitigate such drawbacks by proposing a variable cycle propulsion system for supersonic airplanes which clearly separates the subsonic and supersonic configurations, in particular by using one or more separate auxiliary fans of large diameter.

To this end, the invention provides a variable cycle propulsion system for a supersonic airplane, the system comprising at least one engine having at least one compressor and capable of generating thrust for supersonic flight speeds, and at least one auxiliary propulsion assembly separate from said engine, and capable of generating additional thrust for takeoff, landing, and subsonic cruising speeds, said system further comprising at least one pipe connecting the engine to the auxiliary propulsion assembly to convey thereto compressed air produced by the compressor so as to enable the auxiliary propulsion assembly to generate additional thrust for takeoff, landing, and subsonic cruising flight, there being at least one valve enabling the pipe to be closed off for supersonic cruising flight.

Thus, the auxiliary propulsion assembly used for the takeoff, landing, and subsonic cruising flight stages makes use of engine resources (the production of compressed air). The compressed air is tapped, for example, from the last stage of the compressor of the or each engine and it feeds a combustion chamber of the propulsion assembly. The propulsion assembly has at least one fan which can be dimensioned so as to produce the necessary thrust with the desired bypass ratio during takeoff, landing, and subsonic flight. The propulsion assembly can be housed in the fuselage, so that drag in supersonic flight can be minimized.

BRIEF DESCRIPTION OF THE DRAWINGS

Other characteristics and advantages of the present invention appear from the following description made with reference to the accompanying drawings showing a plurality of embodiments that are not limiting in any way. In the figures.

DETAILED DESCRIPTION OF EMBODIMENTS

Figure 1A:
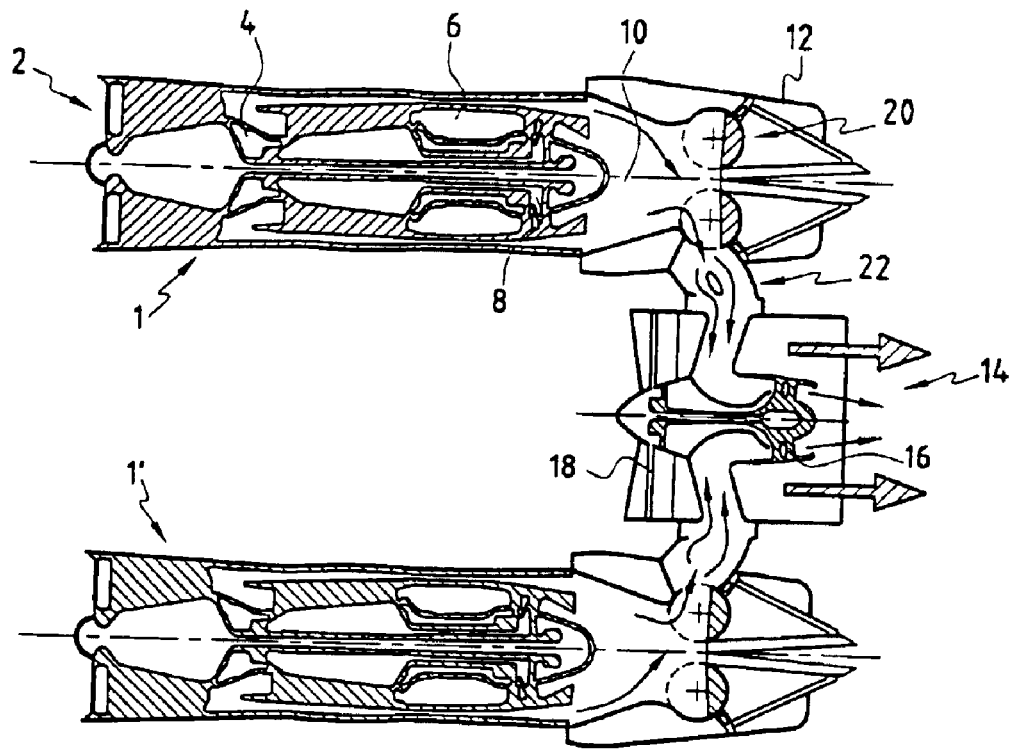
FIGS. 1A and 1B are diagrammatic longitudinal section views through a propulsion system constituting a first embodiment of the invention, shown respectively in its configuration for takeoff, landing, and subsonic cruising flights, and in its configuration for supersonic cruising flight.
Figure 1B:
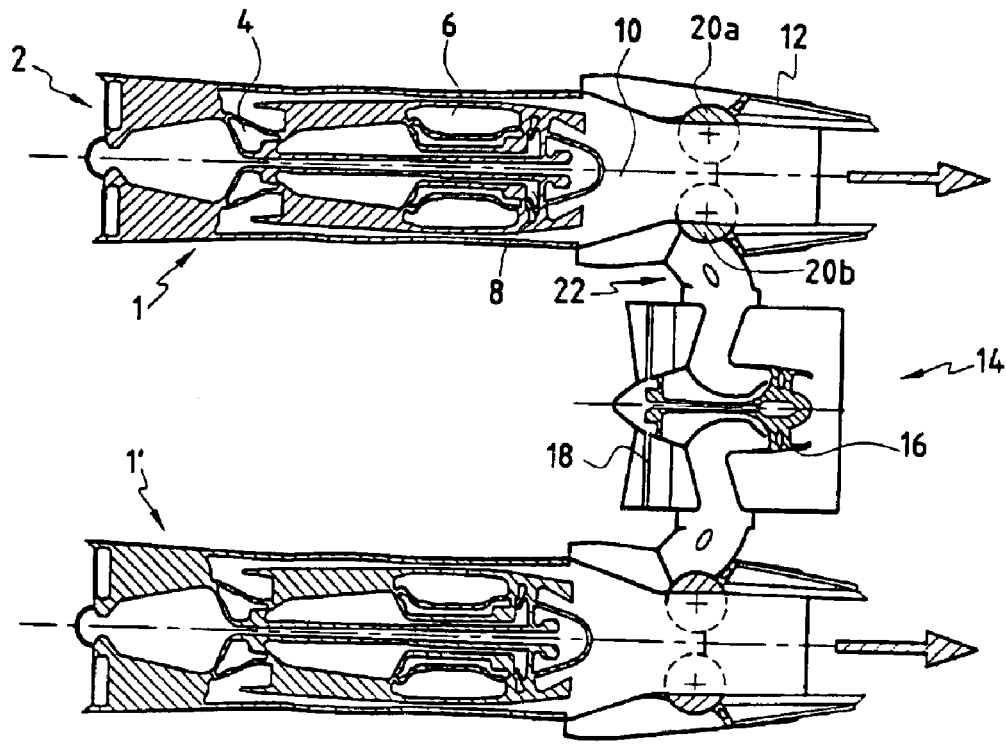

Reference is made to FIGS. 1A and 1B which are diagrammatic longitudinal section views showing a system constituting a first embodiment of the invention, in which it can be seen that the system has two engines 1 and 1'. These engines are conventionally located in low-drag pods (not shown) which are generally connected to the bottom face of an airplane wing.

In conventional manner, these engines can be of the single-flow type, having one, two, or three shafts, or they can be of the double-flow type, having one, two, or three shafts. In this embodiment, each of them comprises an air inlet 2, a compression section 4, a combustion chamber 6, a turbine section 8, and a combustion gas exhaust section 10. The engines are also dimensioned so as to be optimized for supersonic cruising flight (the period involving the longest flying time). The gas exhaust section is terminated by a nozzle 11 of variable section.

In addition, still in this first embodiment of the invention, the propulsion system also comprises an auxiliary propulsion assembly 12 which is separate from the two engines 1 and 1'. This auxiliary propulsion assembly is used for takeoff, landing, and subsonic cruising flight in a configuration which is described below.

The propulsion assembly 12 comprises a turbine 14, a fan 16, and a combustion chamber 18 which is fed with fuel using conventional means (not shown in FIGS. 1A and 1B).

Furthermore, the propulsion system of the invention has at least one pipe 20, 20' connecting each engine 1, 1' to the propulsion assembly 12, and more particularly to the combustion chamber 18 thereof, so as to feed said propulsion assembly with the compressed air produced by at least one compressor 22, 22' of each engine.

More precisely, each pipe 20, 20' opens out into a compressed air manifold, preferably an annular manifold, positioned around the combustion chamber 18 of the propulsion assembly 12.

Advantageously, compressed air is taken from the last stage of the compressors 22, 22' in each engine 1, 1'. Naturally, air could be taken from some different level in the compressors, but the last stage provides the best results since that is the location where air is most highly compressed.

Conventionally, the fan 16 can be a single or multistage fan of large chord or contrarotating, and it is rotated by the turbine 14 which can optionally be fitted at its end with a multistage hub and/or with reduction gearing.

Furthermore, each pipe 20, 20' conveying compressed air to the propulsion assembly 12 is provided with at least one valve 24, 24' enabling the pipe to be shut off at least in part for supersonic cruising flight. The valves 24, 24' are controlled synchronously.

According to a particular characteristic of the invention, the pipes 20, 20' connecting each engine 1, 1' to the combustion chamber 18 of the propulsion assembly 12 convey about 20% to 40%, and preferably 25% to 30% of the compressed air coming from the last stage of the compressors 22, 22' of each engine, with this being applicable specifically to engines designed for supersonic cruising speeds corresponding to a Mach number of about 2.

The operation of the propulsion system constituting this first embodiment of the invention is described below in each of its two possible configurations (takeoff, landing, and subsonic cruising flight stage; and supersonic cruising flight stage).

During takeoff and landing (cf. FIG. 1A), all three assemblies (both engines 1 and 1' together with the propulsion assembly 12) provide thrust simultaneously and the two engines have their own thrust and exhaust speed reduced because of the air that is tapped off from their compressors. The pipes 20, 20' are not closed and they therefore convey compressed air to the combustion chamber 18 of the auxiliary propulsion assembly.

The compressed air conveyed in this way is then mixed with fuel, and the combustion gas produced in the combustion chamber 18 of the propulsion assembly 12 then passes through the turbine 14 which drives the fan 16 of said propulsion assembly so as to generate additional thrust that suffices for takeoff, landing, and subsonic cruising flight.

By appropriately dimensioning the fan 16, the propulsion system can operate with a high bypass ratio and a low exhaust speed which is well suited to takeoff and subsonic cruising flight while complying more easily with requirements concerning noise and low specific fuel consumption. The term "bypass ratio" is used to mean the ratio of the total mass of air exhausted as produced by the fans divided by the mass of combustion gas exhausted as produced both by the combustion chambers of the engines 1, 1' and by the combustion chamber 18.

The transition between subsonic cruising flight and supersonic cruising flight (cf. FIG. 1B) then takes place by closing off the pipes 20, 20' by means of the valves 24, 24' and interrupting the feed of fuel to the combustion chamber 18 until the auxiliary propulsion assembly 12 stops. The engines 1 and 1' then serve on their own to propel the airplane and enable it to reach supersonic flight speeds. The system then operates with very low (or even zero) bypass ratio and very high exhaust speed (which does indeed correspond to high specific thrust).

Figure 2:
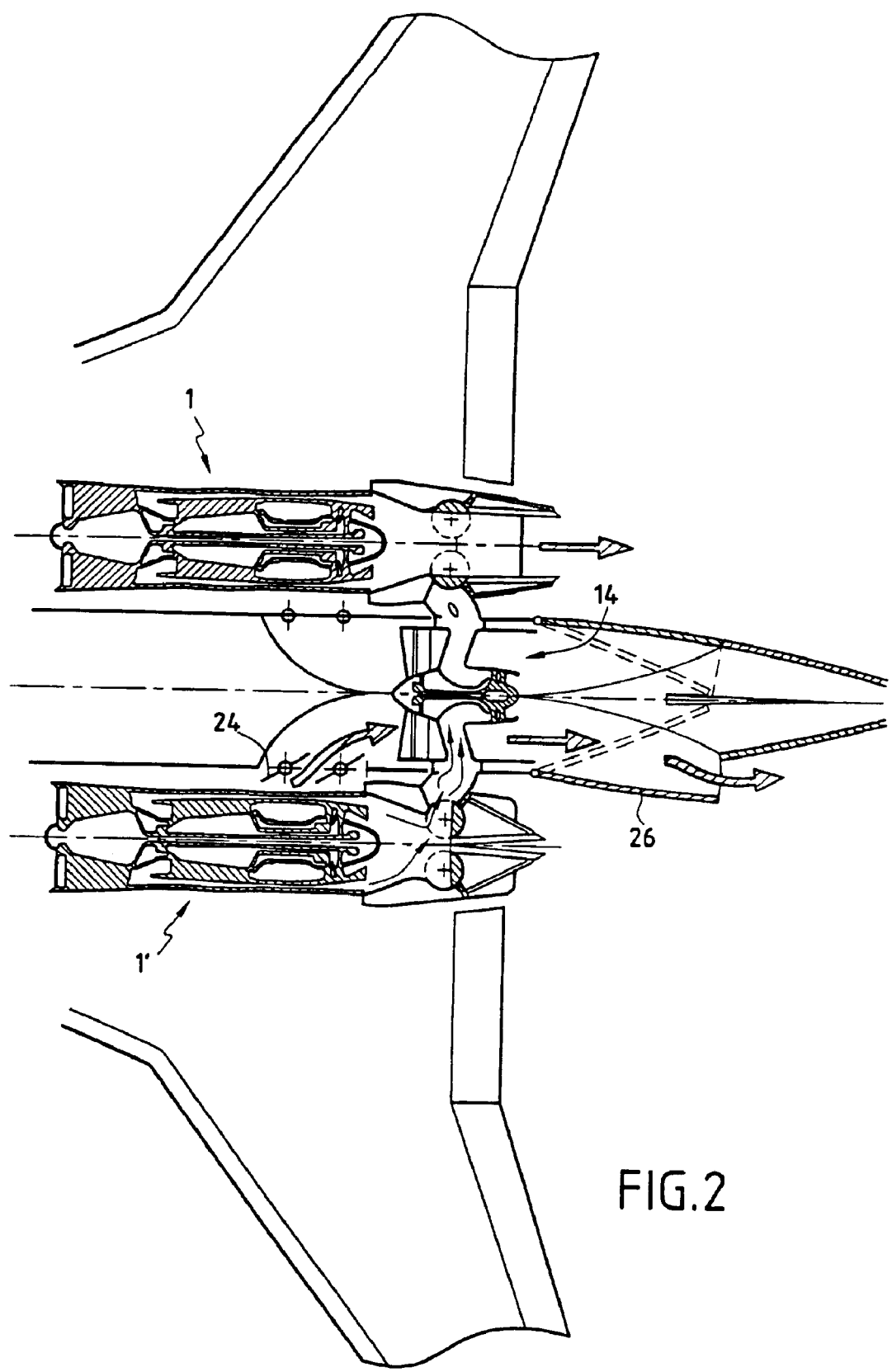
FIG. 2 is a fragmentary diagrammatic view of an airplane including a propulsion device similar to that of FIG. 1, and shown in its two configurations in use.

As shown in FIG. 2, the auxiliary propulsion assembly 12 can be integrated directly in the fuselage of the airplane, in the rear portion thereof. To do this, closable louvers 26 (side louvers as shown and/or ventral louvers) are placed in the airplane fuselage so as to enable air to be fed to the propulsion assembly 12, and deployable exhaust nozzles 28 enable the gas produced by the auxiliary propulsion assembly to be exhausted during takeoff, landing, and subsonic cruising flight.

In another embodiment of the invention (cf. FIG. 3), the system has two engines 1 and 1' independently feeding compressed air to two auxiliary propulsion assemblies 12 and 12'. This embodiment improves the safety of the propulsion system in the event of one of the propulsion assemblies failing.

Furthermore, these two propulsion assemblies can advantageously be offset along the main axis of the airplane so as to optimize the way the assembly occupies volume within the airplane.

Figure 3:
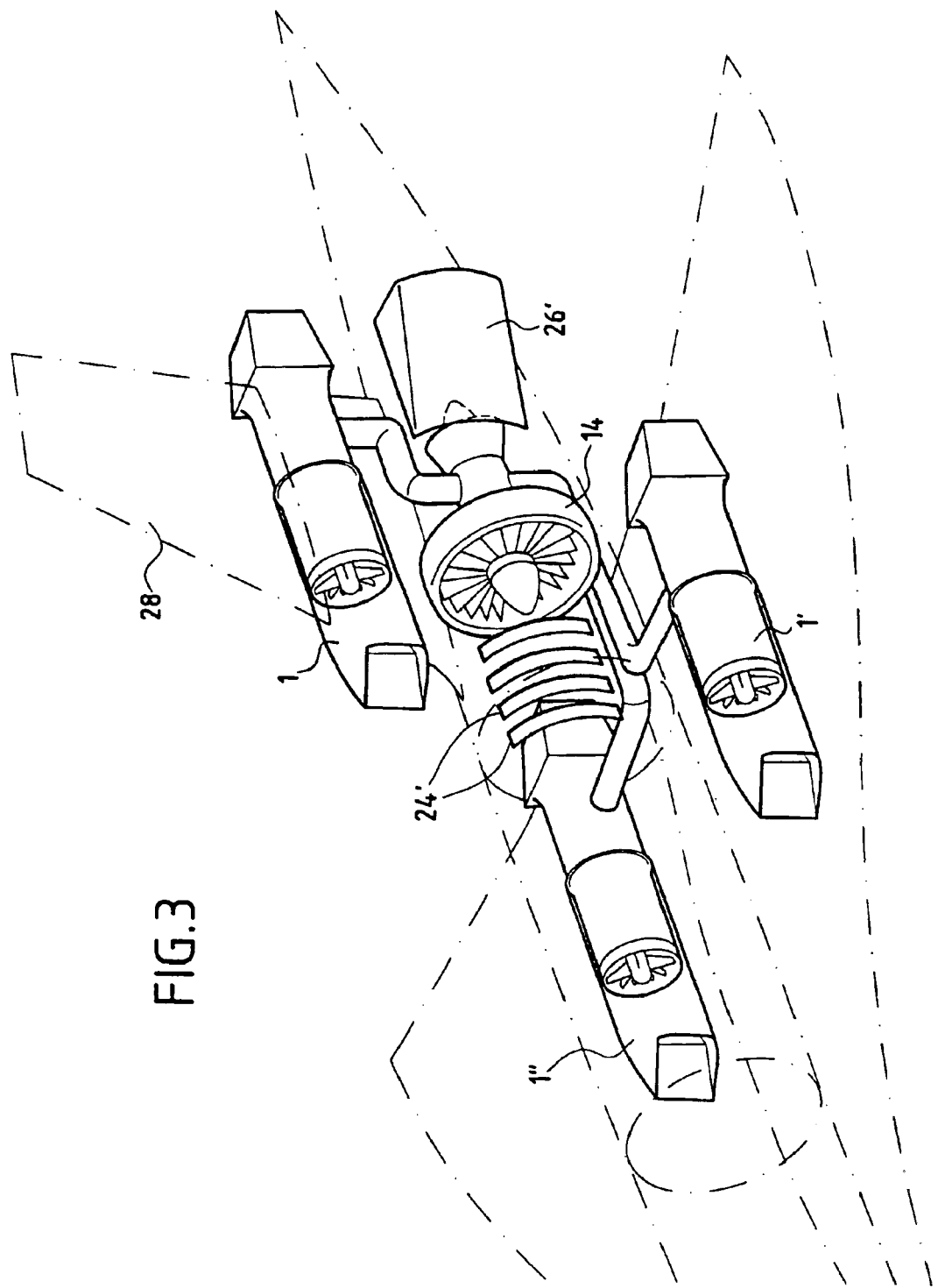
FIG. 3 is a diagrammatic fragmentary view of an airplane including a propulsion system constituting another embodiment of the invention in both configurations of use.

In FIG. 3 it can be seen that closable louvers 26 (side louvers and/or ventral louvers) are likewise provided in the fuselage of the airplane to feed the propulsion assemblies 12 and 12' with air during takeoff, landing, and subsonic cruising flight, and that exhaust nozzles 28 are deployed for exhausting the gas that produces thrust during these stages of flight. When changing over to supersonic cruising flight, the louvers 26 are closed once the auxiliary propulsion assemblies 12 and 12' have been stopped, and the exhaust nozzles 28 are retracted. Drag is then reduced merely to the pod drag of the engines.

Naturally, any other embodiment could be devised that combines one or more engines with one or more propulsion assemblies.

The present invention as described above provides numerous advantages, and in particular:

the propulsion system makes it possible during takeoff and landing to obtain gas exhaust speeds of less than 400 m/s (or close to 300 m/s) which corresponds to a noise level of less than 103 dB (90 dB for a speed of less than 300 m/s);

thrust on takeoff from the engine(s) can be increased compared with the thrust which the engine(s) could produce alone by about 50% to 60% depending on the diameter of the fan of the auxiliary propulsion assembly;

a large reduction in specific fuel consumption during subsonic cruising can be obtained because of the large bypass ratio which is equivalent to that of certain subsonic airplanes;

the propulsion system uses one or more engines of conventional architecture, thereby limiting the risks of breakdown that are frequently associated with new technologies; and in the event of an auxiliary propulsion assembly shutting down or failing, it is possible to close the air tapping valve and to switch over the engine to acting as a direct jet at full power, thereby maintaining sufficient thrust to continue takeoff and then guarantee landing, in which case the main concern is no longer that of complying with noise standards but that of avoiding an accident.

Naturally, the present invention is not limited to the embodiments described above, and the invention covers any variants thereof.

What is claimed is:

1. A variable cycle propulsion system for a supersonic airplane, the system comprising:

at least one low-bypass ratio engine having at least one compressor and configured to generate thrust for supersonic flight speeds;

at least one high-bypass ratio auxiliary propulsion assembly separate from said engine, and configured to generate additional horizontal thrust for takeoff, landing, and subsonic cruising speeds; and at least one pipe connecting the engine to the auxiliary propulsion assembly to convey thereto compressed air produced by the compressor to enable the auxiliary propulsion assembly to generate additional horizontal thrust for takeoff, landing, and subsonic cruising flight and to reduce noise during takeoff, landing, and subsonic cruising flight by increasing a bypass ratio of said propulsion system, at least one valve provided for enabling the at least one pipe to be closed off for supersonic cruising flight, wherein the at least one auxiliary propulsion assembly is housed in an airplane fuselage, wherein louvers are provided in the fuselage, wherein said louvers are open as to feed air to the at least one auxiliary propulsion assembly during takeoff, landing, and subsonic cruising flight, and said louvers are closed for supersonic cruising flight, and wherein retractable exhaust nozzles are provided to exhaust the thrust-producing gas during stages of flight.

2. A system according to claim 1, wherein the auxiliary propulsion assembly includes a combustion chamber fed with compressed air during takeoff, landing, and subsonic cruising flight, a turbine through which a combustion gas produced by said combustion chamber passes, and a fan rotated by said turbine.

3. A system according to claim 1, wherein the pipe conveys about 20% to 40% of air coming from a last stage of the compressor of the engine.

4. A system according to claim 1, having at least two engines feeding compressed air to a single propulsion assembly.

5. A system according to claim 1, comprising at least two engines feeding compressed air independently to two propulsion assemblies to improve safety in an event one of said propulsion assemblies fails.

6. A system according to claim 5, wherein the two propulsion assemblies are offset one behind the other along a main axis of the airplane to optimize a volume occupied therein.

* * * * *